July 30, 1957  R. R. POTTER  2,800,727
TYPEWRITER KEYS IDENTIFICATION BOARD
Filed May 9, 1956
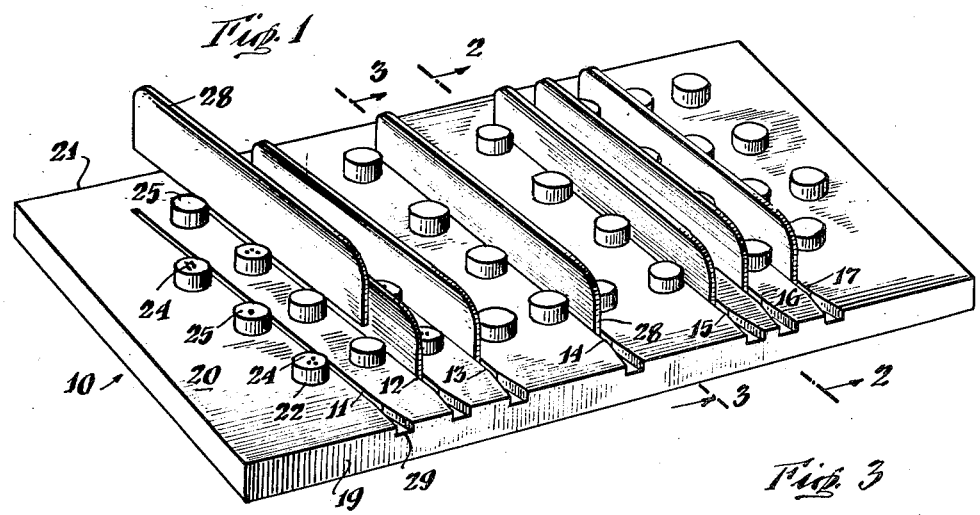
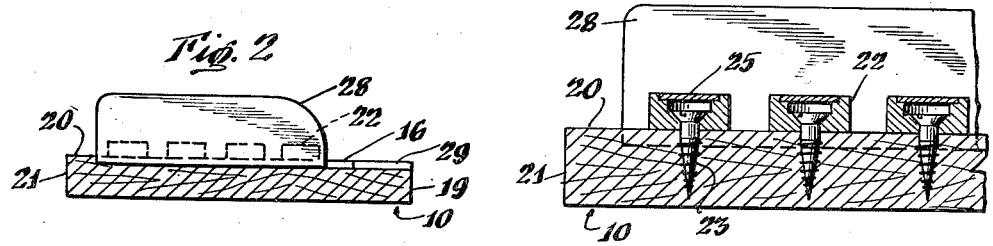
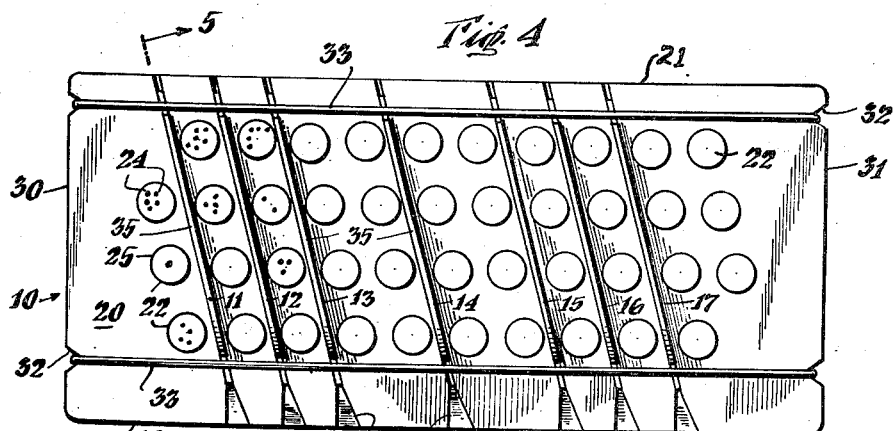
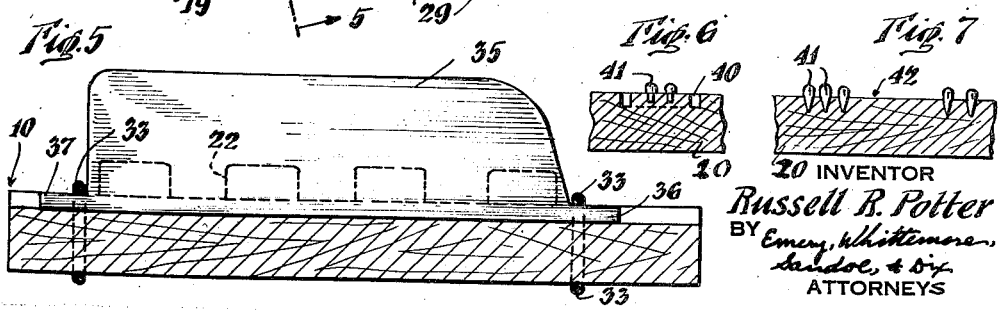
INVENTOR
Russell R. Potter
BY
ATTORNEYS

United States Patent Office 2,800,727
Patented July 30, 1957

2,800,727
TYPEWRITER KEYS IDENTIFICATION BOARD
Russell R. Potter, Jackson Heights, N. Y.

Application May 9, 1956, Serial No. 583,746

1 Claim. (Cl. 35—5)

This invention relates in general to a typewriter key identification board, and in particular to an identification board to be used in teaching and training blind persons how to operate a typewriter and to identify the locations of keys on a regular or standard type of typewriter.

Basically, the novel device of this invention is an identification board on which Braille symbols have been mounted in a pattern imitative of typewriter key positions of a regular typewriter. These Braille symbols may be mounted upon simulated typewriter keys which are mounted on the face of the board, or within circular grooves formed in the face of the board, or the several symbols may be positioned on the board with definite spaces between them. The Braille symbols are raised, so that a sightless person can quickly identify the letter or mark represented thereby.

To aid the blind student-typist to locate his hands in the proper position with respect to the Braille symbols on the identification board without outside aid, a series of removable vanes are positioned in the identification board in a satisfactory manner as by inserting them in grooves provided in the face of the identification board. These vanes separate a series of adjacent symbols, so that, by placing his fingers between the vanes, the blind-student typist will quickly and properly position his fingers on the Braille symbols.

As the student developes skill and confidence, the vanes on the identification board can be removed one by one, until he has mastered the identification board without them. At an advanced point in his learning, the student will begin practice on an operative typewriter, where he can further develop his skill through the use of the vanes described in a previous patent, Potter No. 2,491,332.

The identification board with its vanes may, however, be positioned beside the operative typewriter or be positioned in the lap of the student-learner so that the positions of the keys of the operative typewriter can be readily located by the positions of the vanes on the operative typewriter and the corresponding vanes on the identification board. Therefore, the learner can quickly increase his skill of operation by checking the positions of the vanes on the typewriter and the vanes on the identification board and noting the position of the Braille symbols of the identification board in relation to the keys of the operative typewriter. This procedure the blind person can do without questioning the instructor. It has been found that this procedure permits the blind person to conduct his practice work at home and thus become more proficient in a much shorter time.

A major feature of the present invention is that it provides a much needed device which allows a blind person to teach himself how to operate a typewriter without having to seek assistance continually during his learning period from someone who can see. Sightless persons dislike having constantly to ask those who can see to help them.

Another feature of the present invention is that it provides an improved device for the training of a blind person at a much lower cost than that noted above for the average handicapped person, whether blind or otherwise handicapped, and for giving a type of employment where competent workers are needed and where a blind person will be able to complete successfully with persons who have their sight. The blind's acute sense of touch will aid him in attaining remarkable proficiency in the operation of the operative typewriter.

It is another object of the present invention to provide a novel typewriter identification board which will allow blind persons to train themselves to operate a typewriter.

It is a further object of the present invention to provide a novel typewriter identification board which provides Braille symbols arranged to simulate an operative typewriter keyboard.

It is a still further object of the present invention to provide a novel typewriter identification board which provides keys simulating a real typewriter keyboard and has Braille symbols mounted on the surface of the outlined keys.

It is still another object of the present invention to provide a novel typewriter identification board which contains generally transverse grooves in which fingering vanes may be mounted as finger-guiding means.

It is a further object of the present invention to provide a novel typewriter identification board which will be economical to manufacture and a large portion of which may be formed in a single, molding operation when made of plastic or alloy metals.

These and other objects and features and advantages of the present invention will become more apparent when taken in connection with the illustration of the invention in the accompanying drawings, in which:

Fig. 1 is a perspective view of one embodiment of the invention;

Fig. 2 is a section along the line 2—2 of Fig. 1;

Fig. 3 is a section along the line 3—3 of Fig. 1;

Fig. 4 is a top plan view of another embodiment of the invention;

Fig. 5 is a section taken along the line 5—5 of Fig. 4;

Fig. 6 is a fragment view, partly in section of the practice board showing the Braille symbols surrounded by an annular groove; and Fig. 7 is like Fig. 6, without the annular groove and having a definite space between two of the Braille symbols.

In referring to the drawings, it will be noted that a board 10 is provided with elements placed in proper position to simulate the keys of a regular, standard typewriter, and it will be noted that the Braille symbols are positioned in the tops of keys when the keys are used, or when desired, as noted in Fig. 6, the Braille symbols can be assembled on the face of the board in positions corresponding to the keys of a standard typewriter and the blind person's touch will let him note by channels or grooves around the symbols, or by the spaces between the symbols, as to the locations on the board 10 of the symbols. Thus, the instructing and locating board can have its surface provided with one or more features for locating the Braille symbols and numbers, and having the Braille symbols so positioned that the blind-student-learner can quickly determine the corresponding position of letters and numbers on the standard form of typewriter.

Referring again to the drawings, Fig. 1 shows the support 10 in which have been formed a series of generally transverse grooves, numbered 11 to 17. The grooves extend from the front edge 19 of the face 20 of the support 10 to a point near the rear edge 21 of the face 20. Mounted in a suitable manner on the face 20 are a plurality of Braille symbols in the form of keys which simulate typewriter keys and are arranged in a pattern imitative of a standard typewriter keyboard.

Unlike a typewriter keyboard, however, the keys 22 do not yield to the touch but preferably are firmly anchored in the support 10. As best seen in Fig. 3, each key 22 is, for the purposes of illustration, attached firmly to the support 10 by means of a screw 23. Raised Braille symbols 24, corresponding to the letter and number symbols of standard typewriter keys, are affixed to the upper surface 25 of each key 22.

In providing a guide board of structure particularly usable by the student, it is desired to employ a series of vanes which particularly function as guiding and locating vanes. For instance, if a blind person has his fingers on a standard typewriter keyboard and in touch with the vanes therein, he can decide the location of the particular keys of the standard typewriter by feeling the numbers and positions of the several vanes, and he then can reach to the instruction board and count off the number of vanes and their locations, and place his fingers on the regular keys of the board which carries the Braille symbols. The vanes may be of any particular construction and materials and preferably a thin, flat vane 28 is adapted to fit within each of the grooves and, when within said groove, it remains in substantial vertical position and usually protrudes above the face 20 and upper surfaces 25 of the keys 22 to form the finger-guiding means. As shown in Fig. 1, all the vanes 28, except that vane which is shown in partially removed position, are in vertical position and have been inserted so that they are contiguous with that portion of the groove which is nearest the rear edge 21 of the support 10. A vane 28 in operative position is also shown in Figs. 2 and 3. In order to facilitate the insertion of a vane 28 in a groove, each groove terminates at the front edge 19 in a flared end 29, and preferably the grooves are narrow so that the vanes usually fit by friction gripping.

However, another manner of embodiment of the invention is shown in Figs. 4 and 5. In this embodiment notches 32, adapted to retain resilient members such as rubber bands, or strings 33, have been formed in the end sections 30 and 31 of the support 10 at points in proximity to the front edge 19 and back edge 21 of the support 10. The modified form of vanes 35, to be inserted in the grooves 11—17 of this second embodiment of the invention, which grooves are substantially identical with the grooves of Fig. 1, are best seen in Fig. 5. Each vane 35 is provided with a portion which engages the rubber bands or strings 33 to be held in place and in this instance has a forwardly projecting flange 36 and a rearwardly projecting flange 37. When the vanes 35 are in position in the grooves 11—17, having been forced therein as far to the rear as possible, the resilient members 33 will overlie the flanges 36 and 37, thus keeping the vanes 35 from being easily disturbed and yet not interfering with the keys 22.

In use by a blind person, the embodiment shown in Figs. 1-3 is assembled by sliding a vane 28 in each of the grooves 11—17, using the flared ends 29 to facilitate the insertion. Relying on his sense of touch, the blind student places his fingers over the keys 22 in the standard typewriter position, which he recognizes by feeling the raised Braille symbols 24. He then familiarizes himself with the position of the letters and figures of the identification board, which simulate the arrangement of a standard typewriter keyboard. He practices moving his fingers to spell out words.

When he has attained an increased degree of proficiency he positions the identification board 10 with its vanes 28 beside an actual typewriter, which also has vanes which correspond in position to the vanes of the identification board. Such an operative keyboard with vanes has been described in Patent No. 2,491,332 to Russell R. Potter. The sightless student can then rapidly increase his skill on the operative keyboard by checking his finger positions with regard to the vanes of the operative keyboard with those same finger positions on the identification board, whose keys he can identify due to their raised Braille symbols.

As the blind student's proficiency increases still further, he may remove the vanes 28 one by one from the grooves 13, 15, 12, 16, 11, 17 and finally 14 of the identification board. At the same time he will remove the corresponding vanes from the operative typewriter keyboard, until he finally is typing on the operative keyboard without vanes, and only occasionally checking his finger position by means of the identification board described herein.

The use of the embodiment of the invention illustrated in Figs. 4 and 5 of the drawings is the same as that described just preceding, except that after the vanes 35 have been put in place in the grooves 11—17, the resilient members 33 are placed about the support 10 in cooperation with the notches 32, and overlie the flanges 36 and 37 of the vanes 35. This overlying helps to retain the vanes 35 in place.

As noted in the beginning of the description, the Braille symbols may be located in the face of the board, as particularly shown in modification illustrated in Figs. 6 and 7. In those showings, and especially in Fig. 6, a channel or groove 40 is formed around a Braille symbol 41 and constitutes an equivalent to one of the keys shown in Figs. 1 to 5. The blind-student-learner will be able to readily feel the Braille symbol with the adjacent groove. In Fig. 7 the location of the Braille symbols is in the surface 20 of the board and the location of the symbols for the figures and numbers is obtained by the student noting the distance between the symbols, which distance is generally indicated by the numeral 42. Thus, the blind-student-learner can learn to use the identification board whether it is provided with key-like elements 22, or with Braille symbols with a groove around them, or on equivalent raised ring, if desired, in place of the groove, or by noting the distance between the various Braille symbols, as shown at 42 in Fig. 7.

Thus, it can be seen that through the use of the present invention a blind student-typist will be greatly assisted in the mastering of the typewriter. Not only will his rate of learning be accelerated, but he will be able to teach himself without the constant dependence on a person who can see. By using the identification board described herein in conjunction with a series of similar vanes on an operative typewriter key-board, the blind student can check his own work. If he is in doubt as to the position of any letter or figure on the operative keyboard, he need only transfer his hands to the identification board, locate the proper Braille symbol, and then, with the aid of the vanes of both key-boards, or by counting the number of keys from the right hand or left hand end of a particular row, and relocate that letter or symbol on the operative key-board.

It will be apparent that modifications and alterations may be made within the scope of the invention. As the foregoing description and drawings are for purposes of illustration only, the invention is to be limited only by the scope of the appended claims.

The invention claimed is:

A typewriter identification board comprising a support having a face and containing at least one generally transverse groove extending from the lower edge of said face to a point near the upper edge of said face, simulated keys adapted to be contacted by the fingers positioned on said face in a pattern imitative of typewriter key positions, each of said grooves separating a pair of horizontally adjacent, simulated keys, raised Braille symbols corresponding to symbols on conventional typewriter keys affixed to the upper surfaces of said simulated keys, and a thin, flat vane cooperating with each of said grooves, said vane lying partially within said groove and extending sufficiently above the upper surfaces of said simulated keys to form finger-guiding means, means to retain said vanes in finger guiding position, said retaining means comprising at least one resilient member which encircles said support and overlies a portion of said vane.

References Cited in the file of this patent
UNITED STATES PATENTS

| 1,377,070 | Helguera | May 3, 1921 |
| 1,614,390 | Randall | Jan. 11, 1927 |
| 1,823,130 | Smith | Sept. 15, 1931 |
| 2,154,478 | Smith | Apr. 18, 1939 |